(12) United States Patent
Lai

(10) Patent No.: US 12,436,846 B2
(45) Date of Patent: Oct. 7, 2025

(54) DISTRIBUTED DATA BACKUP, RESTORE AND SYNCHRONIZATION METHOD FOR MULTIPLE DEVICES

(71) Applicant: DELTA ELECTRONICS, INC., Taoyuan (TW)

(72) Inventor: Chun-Fu Lai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/457,871

(22) Filed: Aug. 29, 2023

(65) Prior Publication Data
US 2024/0378120 A1 Nov. 14, 2024

(30) Foreign Application Priority Data
May 11, 2023 (CN) .......................... 202310529218.5

(51) Int. Cl.
*G06F 16/20* (2019.01)
*G06F 11/14* (2006.01)
*G06F 16/27* (2019.01)
*G06F 21/60* (2013.01)

(52) U.S. Cl.
CPC .......... *G06F 11/1469* (2013.01); *G06F 16/27* (2019.01); *G06F 21/602* (2013.01); *G06F 2201/84* (2013.01)

(58) Field of Classification Search
CPC .... G06F 11/1469; G06F 16/27; G06F 21/602; G06F 2201/84
USPC .......................... 707/634, 636, 648, 656, 682
See application file for complete search history.

(56) References Cited

U.S. PATENT DOCUMENTS

| 7,127,535 B1 * | 10/2006 | Huebsch | G06F 11/1456 |
| | | | 714/E11.12 |
| 7,698,398 B1 * | 4/2010 | Lai | G06Q 30/00 |
| | | | 709/228 |
| 8,069,435 B1 * | 11/2011 | Lai | H04L 67/51 |
| | | | 717/106 |

(Continued)

FOREIGN PATENT DOCUMENTS

| CN | 101216790 A | 7/2008 |
| CN | 104503869 A | 4/2015 |

(Continued)

OTHER PUBLICATIONS

Office Action dated May 6, 2024 of the corresponding Taiwan patent application No. 112117487.

*Primary Examiner* — Daniel A Kuddus
(74) *Attorney, Agent, or Firm* — Muncy, Geissler, Olds & Lowe, P.C.

(57) ABSTRACT

Data backup, restore, and synchronization methods for multiple devices are provided. The data backup method applied for a local device of the multiple devices includes 1) sending a querying packet including a group identifier to at least one of the multiple devices to search for at least one backup provider; 2) receiving at least one response packet including the group identifier to make a backup plan; 3) preparing a data block and setting at a shared memory of at least one backup service provider based on the backup plan to generate a data packet including the group identifier and the data block; and 4) sending the data packet to the at least one backup service provider to back up the data block to the shared memory.

19 Claims, 8 Drawing Sheets

(56) References Cited

U.S. PATENT DOCUMENTS

| | | |
|---|---|---|
| 8,275,752 B2 | 9/2012 | Tsai et al. |
| 8,346,929 B1 * | 1/2013 | Lai .................. H04L 67/51 709/226 |
| 10,007,577 B2 | 6/2018 | Bronk |
| 10,762,039 B2 | 9/2020 | Iwasaki et al. |
| 2002/0019935 A1 * | 2/2002 | Andrew ............ G06F 21/604 713/165 |
| 2005/0044197 A1 * | 2/2005 | Lai .................. H04L 67/02 709/223 |
| 2014/0040206 A1 * | 2/2014 | Ramakrishnan .... G06F 11/2097 707/674 |
| 2015/0227602 A1 | 8/2015 | Ramu et al. |
| 2018/0052451 A1 | 2/2018 | Billi Duran et al. |
| 2020/0019935 A1 * | 1/2020 | Jan ................ G06Q 10/06311 |
| 2020/0029787 A1 * | 1/2020 | Wen .................. A61B 5/002 |
| 2020/0220637 A1 * | 7/2020 | Barry .................. H04J 3/06 |
| 2020/0344233 A1 * | 10/2020 | Lai .................. G06Q 20/4014 |
| 2021/0149788 A1 * | 5/2021 | Downie ............ G06F 11/3604 |
| 2021/0173760 A1 * | 6/2021 | Downie ............ G06F 11/3698 |
| 2021/0389898 A1 * | 12/2021 | Hironaka ............ G06F 3/0685 |
| 2022/0069983 A1 * | 3/2022 | Yoshida .................. H04L 9/12 |
| 2022/0101099 A1 * | 3/2022 | Oshima ................ G06N 3/065 |

FOREIGN PATENT DOCUMENTS

| | | |
|---|---|---|
| CN | 108829539 A | 11/2018 |
| CN | 112104531 A | 12/2020 |
| CN | 108292250 B | 6/2022 |
| EP | 3785125 * | 3/2021 |
| EP | 3785125 A1 * | 3/2021 |
| TW | I378344 B | 12/2012 |

* cited by examiner

DISTRIBUTED DATA BACKUP, RESTORE AND SYNCHRONIZATION METHOD FOR MULTIPLE DEVICES

BACKGROUND OF THE DISCLOSURE

Technical Field

The disclosure relates to a backup method, and more particularly to a distributed data backup method for multiple devices.

Description of Related Art

In current industrial automation applications, users need to perform backup and restoration to target devices through specific equipment, which is also known as centralized backup and restoration. For example, the backup and restoration are implemented by a personal computer to programmable logic controllers (PLCs), by human-machine interfaces (HMI) to the PLCs, or by the PLCs to field bus devices.

Implementing backup and restoration involves two components: (1) the communication interface, which allows data exchange between any two devices; (2) the content, which can be configuration parameters, historical records, or firmware programs. In practice, users can use the PLCs to configure parameters of variable frequency drives or download programs to the PLCs through the HMIs; however, these two approaches generally use different communication interfaces and are limited to specific types of devices.

Furthermore, the above-mentioned approaches do not support proactive backup and restoration, nor do they provide data encryption protection mechanisms, which results in ineffective management and protection of the backup and restoration mechanisms.

Therefore, providing a backup and restoration method and system that supports heterogeneous devices, automation, and encryption protection is an important challenge in this field.

SUMMARY OF THE DISCLOSURE

The disclosure is directed to a distributed data backup and sharing mechanism among multiple devices for achieving memory sharing and automated restoration among different types of devices.

One of the exemplary embodiments of the present disclosure is to provide a data backup method for multiple devices applied for a local device of the multiple devices, including: 1) sending a querying service packet including a group identifier to at least one of the multiple devices to search for at least one backup service provider; 2) receiving at least one response packet including the group identifier to make a backup plan; 3) preparing a data block and setting a shared memory of the at least one backup service provider based on the backup plan to generate a data packet comprising the group identifier and the data block; and 4) sending the data packet to the at least one backup service provider to back up the data block to the shared memory.

One of the exemplary embodiments of the present disclosure is to provide a data restore method for multiple devices applied for a local device of the multiple devices, including: A1) sending a querying service packet comprising a group identifier to at least one of the multiple devices to search for at least one restoration service provider; A2) receiving at least one response packet including the group identifier from the at least one restoration service provider to make a restoration plan; A3) sending a restoration request to the at least one restoration service provider based on the restoration plan to request for retrieving a data block from a shared memory of the at least one restoration service provider; and A4) receiving a data packet including the group identifier and the data block from the at least one restoration service provider.

One of the exemplary embodiments of the present disclosure is to provide a data synchronization method for multiple devices applied for a local device of the multiple devices, including: B1) sending a querying service packet including a group identifier to at least one of the multiple devices to search for at least one synchronization service provider; B2) receiving at least one response packet including the group identifier from the at least one synchronization service provider to make a synchronization plan; B3) sending a synchronization request to the at least one synchronization service provider to request for synchronizing a data block from a shared memory of the at least one synchronization service provider; and B4) receiving a data packet including the group identifier and the data block from the at least one synchronization service provider.

The disclosed distributed data backup, restore and synchronization method for the multiple devices, an electronic device, and a data management system offer the following advantages:

1. The local device may search for the service providers with the same group identifier in the hierarchical structure or network topology and use the multiple shared memories for data backup, restoration, and synchronization. This achieves distributed backup, restoration, synchronization, and deployment.
2. Through the flexible backup, restoration, and synchronization plans and encryption processes, the disclosure may fully use network nodes to transmit the restoration data and protect information security in a trusted local area network or an open network.
3. In industrial automation applications, grouping the heterogeneous devices from a same production line may realize group backup and restoration processes of the heterogeneous devices without affecting other production lines, and this facilitates production line change.
4. Following advantage 3, since the heterogeneous devices belonging to the same group may access the backup data from the shared memories of other devices, computational resources and data throughput of a single device can be distributed, and the risk of backup failures is also reduced.

It is understood that both the foregoing general description and the following detailed description are by examples, and are intended to provide further explanation of the disclosure as claimed.

DETAILED DESCRIPTION

Figure 1:
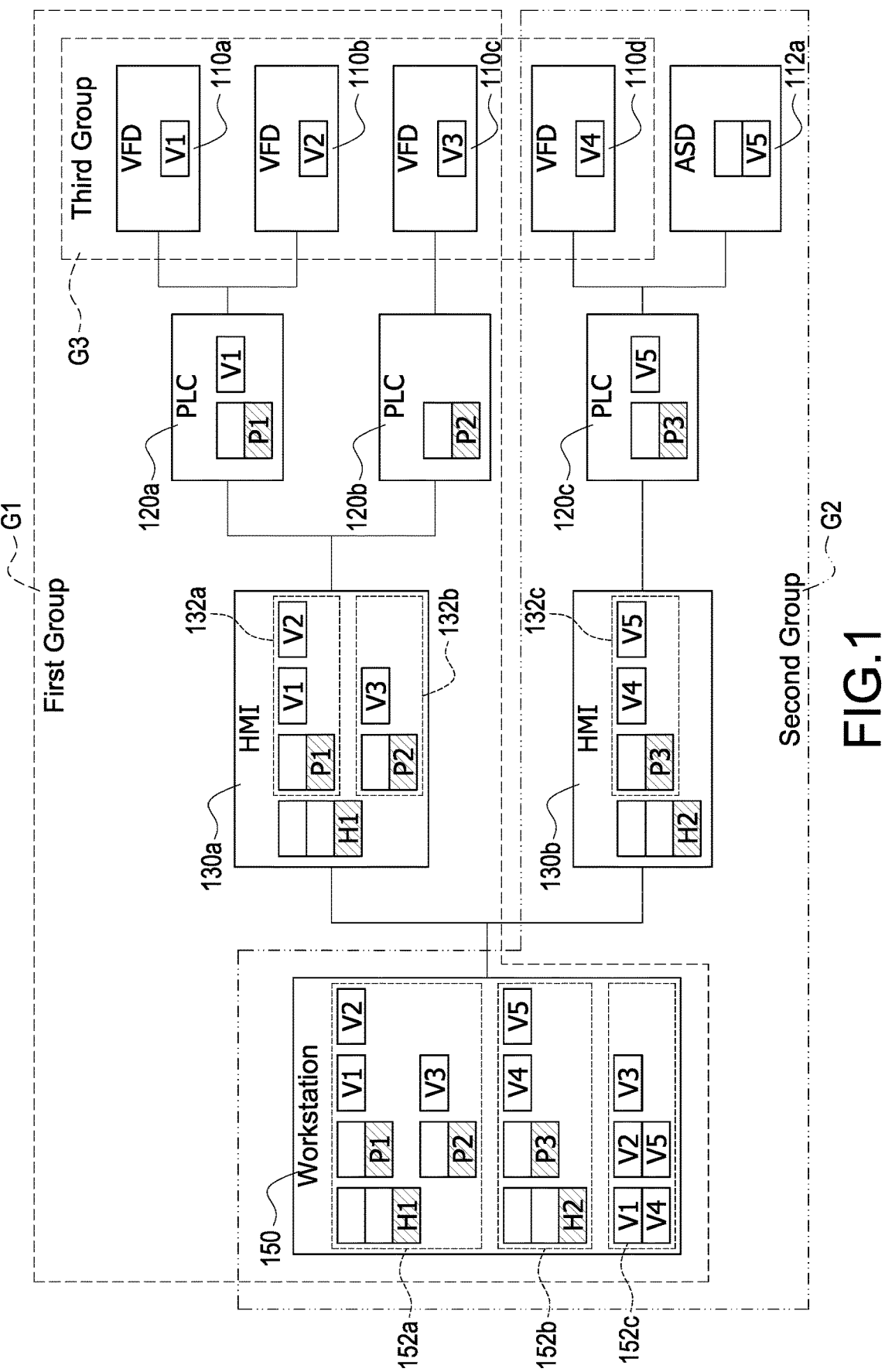
FIG. 1 is a schematic diagram illustrating a hierarchical structure of distributed data backup, data restoration, and data synchronization according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a hierarchical structure of distributed data backup, data restoration, and data synchronization according to one embodiment of the present disclosure. In one embodiment, the hierarchical structure includes multiple electronic devices for industrial control systems, such as a variable frequency driver (hereinafter referred to as "VFD"), an alternating-current servo driver (hereinafter referred to as "ASD"), a programmable logic controller (hereinafter referred to as "PLC"), or a human machine interface (hereinafter referred to as "HMI"). In the embodiment of FIG. 1, the hierarchical structure includes multiple VFDs 110a to 110d, an ASD 112a, multiple PLCs 120a to 120c, and multiple HMIs 130a and 130b.

In industrial automation, for example, Workstation 150 is configured to set operation parameters of multiple production lines or multiple sites to control the HMIs 130a and 130b. The HMIs 130a and 130b are configured to set operation parameters of one production line or one site to control the PLCs 120a to 120c. The PLCs 120a to 120c are configured to set motor parameters to control the VFDs 110a to 110d and the ASD 112a. To achieve the aforementioned control mechanism, each of the devices includes a communication module and connects to other devices by the communication module to exchange packets, thereby forming the Internet of Things (IoT).

In one embodiment, the communication module is configured to support one or more communication interfaces. For example, the communication interfaces of the VFDs 110a to 110d and the ASD 112a support the RS-485; the communication interfaces of the PLCs 120a to 120c support the RS-485 and the Ethernet; and the communication interfaces of the HMIs 130a to 130b support the Ethernet. As shown in FIG. 1, the VFD 110a links to the PLC 120a by the RS-485, and the PLC 120a links to the HMI 130a by the Ethernet. The communication module of the devices can perform communication interface translation to interpret the packet message.

In one embodiment, each of the Workstation 150 and multiple devices (i.e., the multiple electronic devices for the industrial control system mentioned above) is equipped with a memory, and part of the memory is configured to be a shared memory in the hierarchical structure. The shared memory is configured to allow other devices with access authority to read or write data.

In one embodiment, each device is assigned to a group identifier. The devices with the same group identifier are recognized by the system as belonging to the same group and having the access authority of the shared memory of all the devices in the same group. In another embodiment, one device may be assigned to multiple group identifiers, therefore the device is recognized by the system as belonging to multiple groups at the same time and having multiple access authorities of the shared memory of the devices in the multiple groups. Member devices of the same group may back up data to each other, and the devices belonging to different groups only serve as intermediate devices for assisting data transmission without performing data backup processes. In one embodiment, each data block is assigned to a group identifier, and the device with the same group identifier has the access authority to access the data block corresponding to the same group identifier. In one embodiment, the device includes an operation interface provided to the user to input one or more group identifiers of the device. For example, the Workstation 150, the HMIs 130, and the HMI 130b have the operation interface provided the user to input the group identifier and select the group members.

As shown in FIG. 1, the devices in the hierarchical structure are respectively configured to belong to one to three different groups. A first group G1 includes the Workstation 150, the HMI 130a, the PLCs 120a to 120b, and the VFDs 110a to 110c, which is a heterogeneous device group. All the devices of the first group G1 belong to a product line or an assembly line, so each of the Workstation 150, the HMI 130a, the PLCs 120a to 120b, and the VFDs 110a to 110c may access the shared memory of other devices of the first group G1 to perform the data back up and the data restoration process.

Similarly, a second group G2 includes the Workstation 150, the HMI 130b, the PLC 120c, the ASD 112a, and the VFD 110d, which is the heterogeneous device group. All the device of the second group G2 belong to another product line or assembly line, so each of the Workstation 150, the HMI 130b, the PLC 120c, the ASD 112a, and the VFD 110d may access the shared memory of other devices of the second group G2 to perform the data back up and the data restoration process.

Assigning the multiple heterogeneous devices of the same product line into the same group may achieve the grouping backup and restoration processes of the heterogeneous devices without affecting other product lines, which facilitates product line change. Additionally, because the heterogeneous devices belonging to the same group may access the backup data in the shared memory of other devices in the same group, the computation resource and data throughput of a single device is distributed and the risk of backup failure is also reduced. For example, the HMI 130b, the PLC 120c, the ASD 112a, and the VFD 110d do not have to request the Workstation 150 for accessing the backup data, so the computation resources and the data throughput of the Workstation 150 are reduced, and the risk of backup delay or backup failure due to the busy condition, the crashed condition, or the memory corruption may be decreased. Moreover, the device data may be divided into multiple data blocks, and each device may decide the backup strategy according to the data block importance, the time stamp, or the serial number; therefore, it is unnecessary to back up all the data blocks to the same device.

A third group G3 includes the VFDs 110a to 110d, and is a homogeneous device group. Each of the VFDs 110a to 110d may access the shared memory of other devices of the third group G3 to perform the backup process and the recovery process. Allocating the homogeneous devices of the same factory to the same group may realize the group backup process and the group recovery process to the homogeneous devices without affecting other heterogeneous devices. Because hardware specifications and supported communication interfaces of the homogeneous devices are similar, the speed of accessing data by the device linking to the homogeneous devices nearby is relatively faster; therefore, the efficiency of the data backup process is enhanced. In one embodiment, downstream devices of the same group may back up data to upstream devices to implement the distributed data backup and deployments. Taking the first group G1 as an example, the VFD 110a may back up and deploy its own data V1 to the upstream devices: the PLC 120a, the HMI 130a, and the Workstation 150; the PLC 120a may back up and deploy its own data P1 to the upstream devices: the HMI 130a, and the Workstation 150; and the HMI 130a may back up and deploy its own data H1 to the upstream device: the Workstation 150. Taking the second group G2 as an example, the ASD 112a may back up and deploy its own data V5 to the upstream devices: the PLC 120c, the HMI 130b, and the Workstation 150; the PLC 120c may back up and deploy its own data P3 to the upstream devices: the HMI 130b and the Workstation 150; and the HMI 130b may back up and deploy its own data H2 to the upstream device: Workstation 150.

In one embodiment, the upstream devices may access the backup data of the downstream devices of the same group to actively perform the data backup process (i.e., the data synchronization) and the backed-up data may be regarded as the source of the data recovery. For example, when the VFD 110a has backed up the data V1 to the HMI 130a, the Workstation 150 may synchronize the data by accessing the backup data V1 stored in HMI 130a at a daily certain time. Therefore, when the VFD 110a needs to be restored, the Workstation 150 serves as the data source for restoration.

In one embodiment, the devices of the same hierarchy or homogenous devices may copy their own data onto other devices of the same hierarchy or homogenous devices or substitute their data for the data of other devices, which enables distributed data backup and deployments. Taking the first group G1 as an example, the homogeneous PLC 120a may copy or replace its own data P1 to the homogeneous PLC 120b, so the contents of the data P1 and P2 are substantially the same. As homogeneous devices, the VFD 110a may copy or replace its own data V1 to the VFDs 110b to 110c, so the contents of the data V1, V2, and V3 are substantially the same. From another perspective, if the data V1 of the VFD 110a is the initial configuration data V1, copying the initial configuration data V1 onto or substituting the initial configuration data V1 for the homogenous VFDs 110b to 110c may achieve the data restoration or reset the homogeneous devices.

In one embodiment, compared to the downstream devices, the upstream devices have more and complicated operational functionality, so the size of the data block of the upstream devices can be one or multiple times larger than the size of the data block of the downstream devices. To ensure that the data is correctly stored in the shared memory, the storage capacity or the size of the storage blocks in the shared memory of the upstream devices is also one or multiple times larger than the storage capacity or the size of the storage blocks of the downstream devices.

In one embodiment, the upstream devices of the same group may respectively allocate the multiple shared memories to multiple downstream branches, where the multiple downstream branches include parts of the downstream devices. Taking the first group G1 as an example, the upstream HMI 130a links to two downstream branches, where one branch includes the PLC 120a and the VFDs 110a to 110b, and another branch includes the PLC 120b and the VFD 110c. The upstream HMI 130a allocates the shared memory 132a to the downstream branch including the PLC 120a and the VFDs 110a to 110b to store the data P1, V1, and V2; the upstream HMI 130a allocates another shared memory 132b to another downstream branch including the PLC 120b and the VFD 110c to store the data P2 and V3. Taking the second group G2 as an example, the upstream HMI 130b allocates the shared memory 132c to the downstream branch including the PLC 120c, the VFD 110d, and the ASD 112a to store the data P3, V4, and V5. The Workstation 150 is the top upstream device of the first group G1, the second group G2, and the third group G3 and allocates the multiple shared memories 152a to 152c to the multiple downstream branches to back up the data of all the downstream devices. The Workstation 150 allocates the shared memory 152a to the first group G1, allocates the shared memory 152b to the second group G2, and allocates the shared memory 152c to the third group G3 to back up the data of all the downstream devices.

In FIG. 1, the data blocks H1 to H2 and P1 to P3 filling with slash lines have the same data type, i.e., a first data type (such as configuration parameters), the data blocks V1 to V5 filling with blank and blank data blocks without being numbered have the same data type, i.e., a second data type (such as the history data), where the contents of the data blocks having the same type may be substantially the same or different. It should be noted that the ASD 102a includes the data blocks having different data types. When performing the data recovery or the resetting process, the ASD 102a accesses the data blocks from at least one device of the same group based on a data accessing strategy (such as the data intactness, the device priority, and the like), so the flexibility of accessing data is enhanced. For example, the ASD 102a may access the data blocks having different data types from at least one of the Workstation 150, the HMI 130b, and the PLC 120c of the second group G2.

Figure 2A:
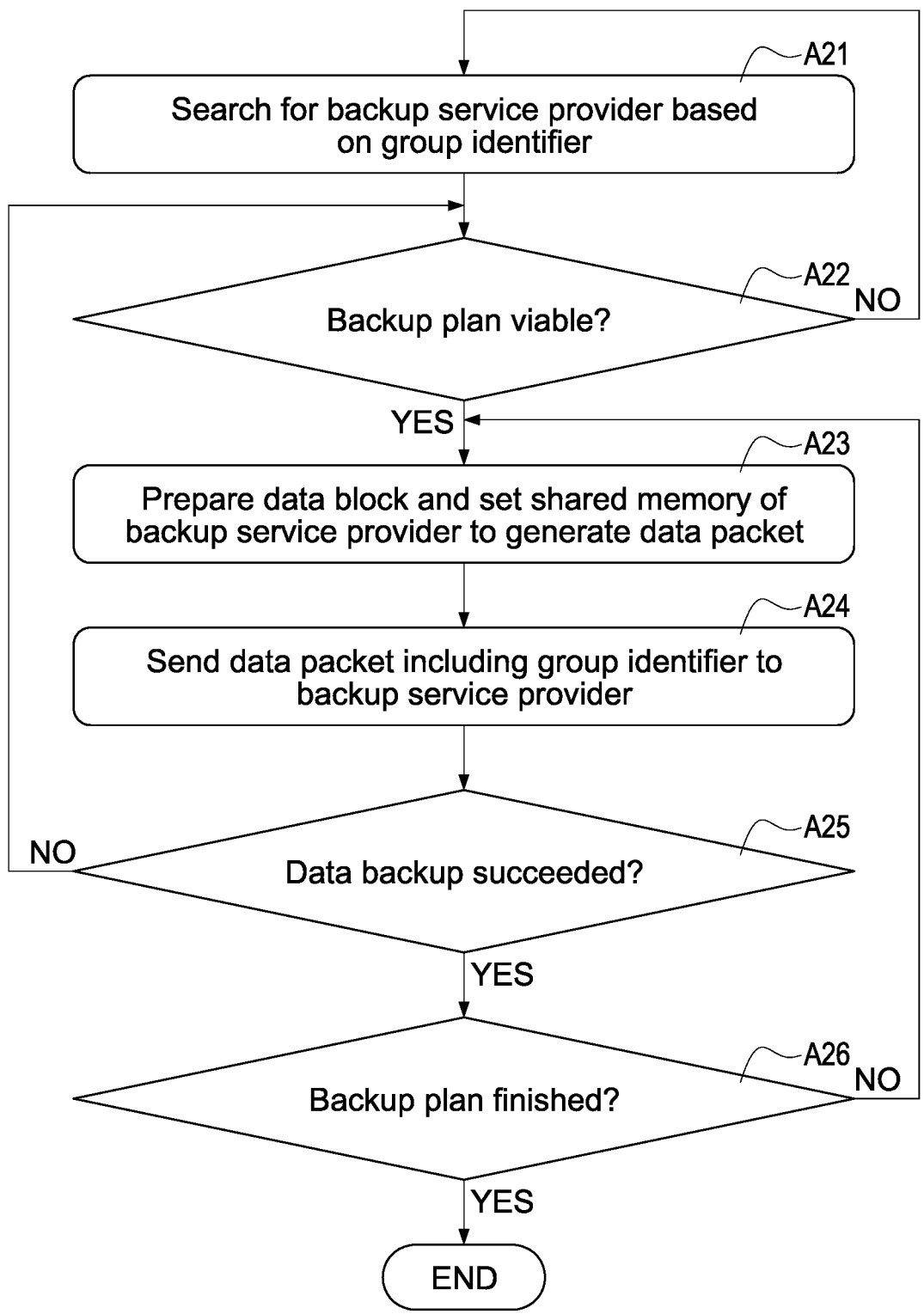
FIG. 2A is a flowchart illustrating the data backup processes performed by the local device according to one embodiment of the present disclosure.

For further describing the backup process, reference is made to FIG. 2A. FIG. 2A is a flowchart illustrating the data backup processes performed by the local device according to one embodiment of the present disclosure. The data backup processes include the following steps:

Step A21: Search for a backup service provider based on the group identifier.

Step A22: Make a backup plan and confirm whether the backup plan is viable; go to step A23 if yes; go back to step A21 if no.

Step A23: Prepare the data block and set the shared memory of the backup service provider to generate the data packet.

Step A24: Send the data packet including the group identifier to the backup service provider.

Step A25: Determine whether the data backup is succeeded; go to step A26 if yes; go back to step A22 if no.

Step A26: Determine whether the backup plan is finished; end the backup process if yes; go back to step A23 if no.

In step A21, a local device searches for the backup service provider based on the group identifier. Specifically, the local device sends a querying service packet including the group identifier to at least one device to search for the service provider belonging to the same group. In one embodiment, if the local device supports the RS-485 communication interface, the local device sends the querying service packet by polling to the at least one device of the same group (i.e., the potential service provider). In one embodiment, if the local device supports the TCP/IP communication protocol of the Ethernet interface, the local device broadcasts the querying service packet to multiple devices of the same group. In one embodiment, the local device unicasts or multicasts the querying service packet to at least one device. Afterwards, the local device receives at least one response packet to confirm the searched service provider, and creates a group device list.

In step A22, the local device makes the backup plan and confirms whether the backup plan is viable. When there is no service provider or the network status is unavailable, such that the backup plan is not viable or the packet transmitting fails, the local device updates the backup plan to search for the backup service provider again (i.e., going back to step A21). In one embodiment, the backup plan includes to-be-backed-up data and the shared memory (also called "data pool") corresponding to the to-be-backed-up data. Specifically, the to-be-backed-up data is divided into multiple data blocks according to a data importance, a data type, a data quantity, a time stamp, and a serial number. Afterwards, the local device sets the shared memory corresponding to the data block from the group device list according to a communication interface, a hop count, a device priority, and a memory capacity; that is to say, the local device selects the backup service provider that the data packet is sent to. For example, the data block having a high importance is set to be shared among the multiple shared memories, and backed up sequentially by the backup service providers, starting from the nearest towards the farthest (e.g., starting from the smallest to the greatest hop counts counting from the local device), to minimize the risk of backup failures. For example, when the multiple backup service providers on the group device list support the TCP/IP communication protocol, the local device selects the multiple shared memories for the data blocks to make a multicast backup plan and progresses a batch backup to enhance the backup efficiency.

Figure 3:
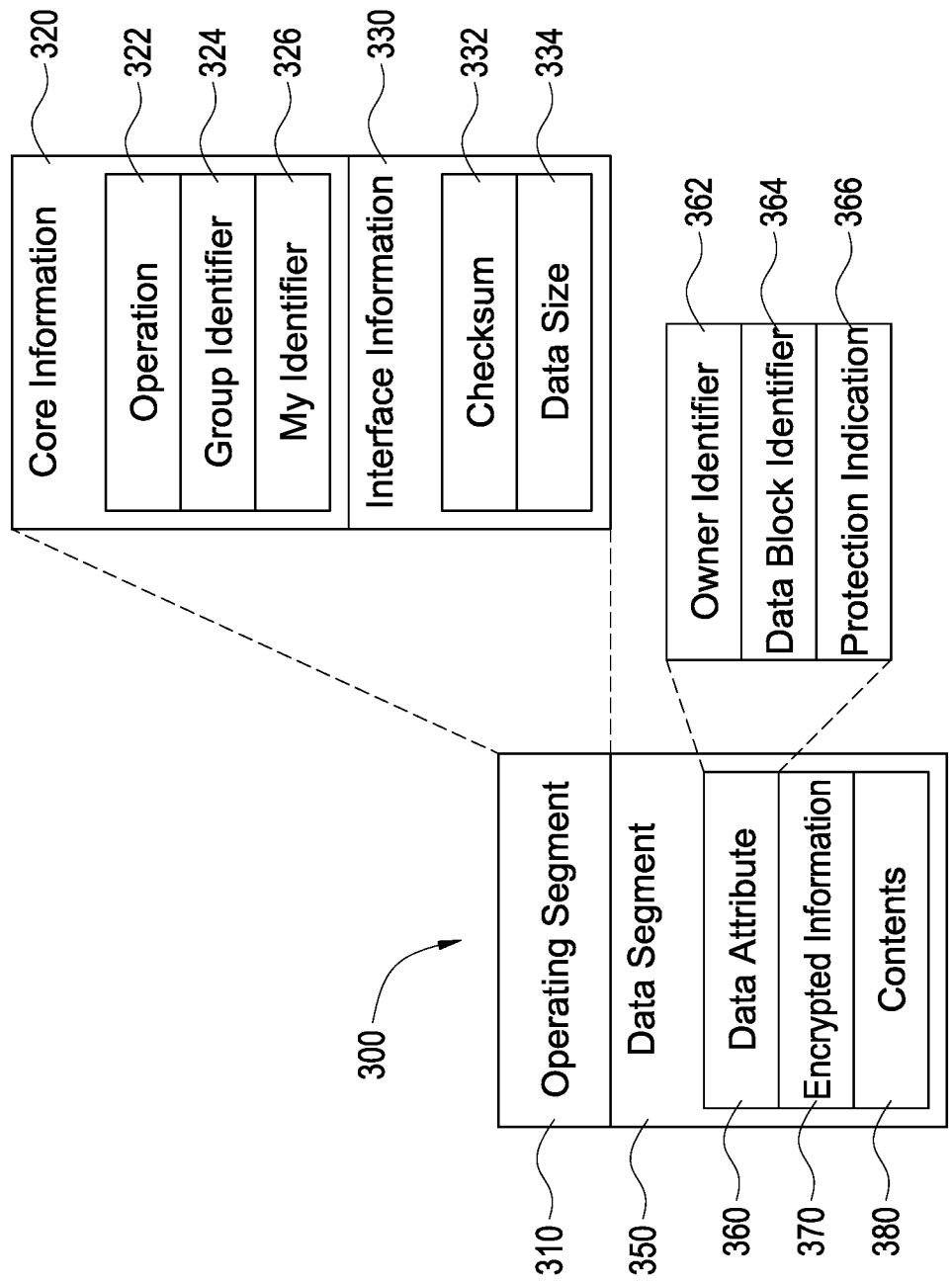
FIG. 3 is a schematic diagram illustrating a packet format according to one embodiment of the present disclosure.

In step A23, when the backup plan is viable, the local device prepares the data block and sets the shared memory according to the backup plan to generate the data packet. For example, the local device respectively packs each data block into the data packet according to a packet format (as shown in FIG. 3).

In step A24, the local device sends the data packet to the backup service provider through the communication interface to back up the data block to the shared memory.

In step A25, the local device confirms whether the data backup is succeeded. In one embodiment, when receiving a backup acknowledgment from the service provider, the local device confirms that the data backup is succeeded. On the contrary, when receiving a failure message from the service provider or not receiving any backup acknowledgment within a valid period, the local device renews the backup plan and confirms whether the renewed backup plan is viable (i.e., going back to step A22).

In step A26, when confirming that the data is successfully backed up to the shared memory of the service provider, the local device confirms whether the backup plan is finished. In the embodiment, the local device reexecutes step A23 to step A25 until the backup plan is finished (e.g., the data divided into the multiple data blocks is completely backed up). Then, the local device ends the backup process when the backup plan is finished.

In one embodiment, in step A23, the data backup method further includes the local device performing an encryption process to the data block to generate the data packet. Therefore, the intermediate device is incapable of decrypting the data packet when the intermediate device does not support the same encryption process. If the hierarchical structure shown in FIG. 1 is an open network, encrypting the data block protects information security.

In brief, through the disclosed data backup process, the local device searches for the backup service providers with the same group identifier in the hierarchical structure or network topology, as shown in FIG. 1, and backs up the data to the multiple shared memories to achieve the distributed data backup and deployment. Furthermore, with flexible backup plans and the encryption process, this disclosure may fully utilize the network nodes to transmit the backup data and ensure information security in the open network.

Figure 2B:
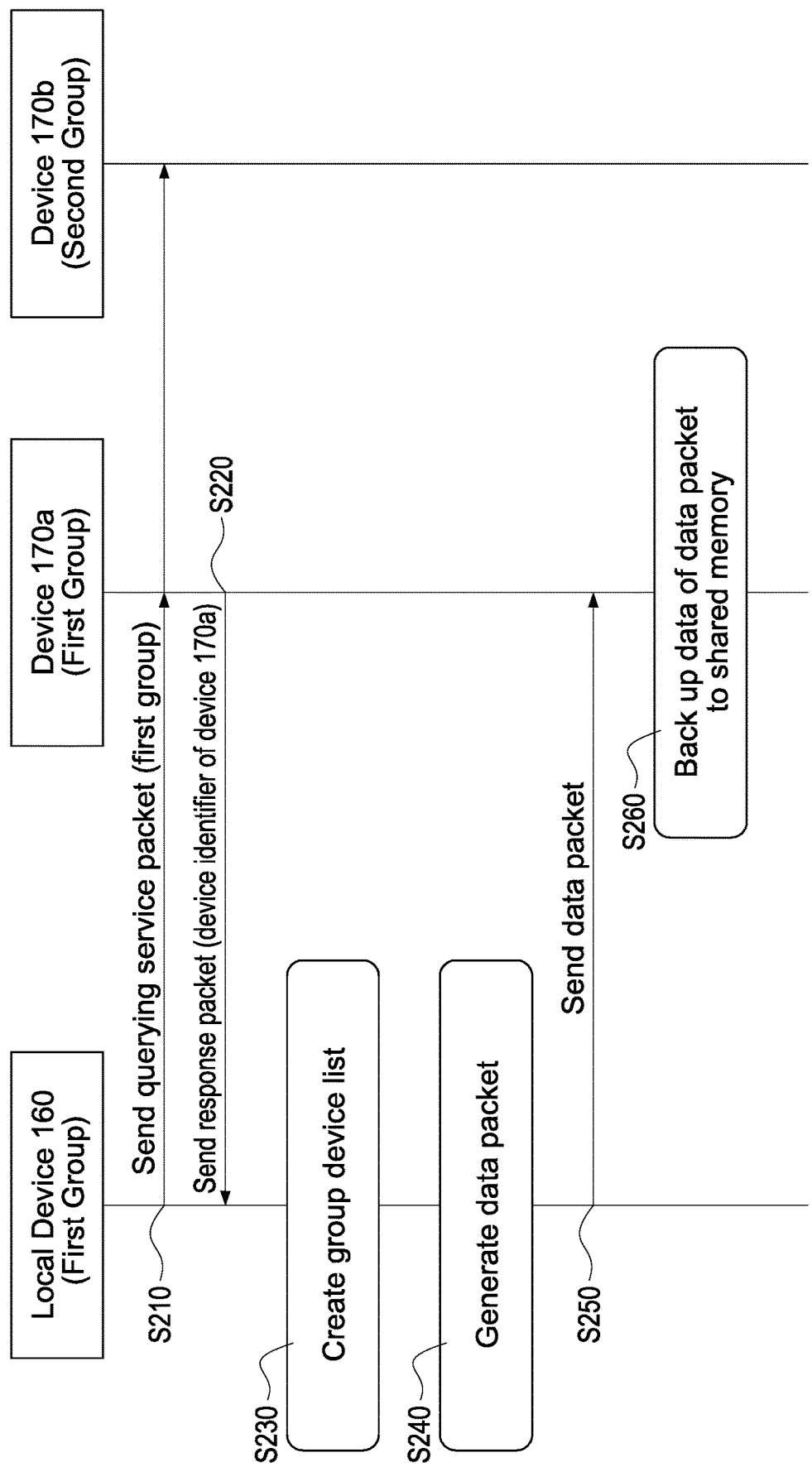
FIG. 2B illustrates a packet sequence describing the data backup according to one embodiment of the present disclosure.

FIG. 2B illustrates a packet sequence describing the data backup according to one embodiment of the present disclosure. In step S210, the local device 160 sends a querying service packet including the group identifier to at least one of target devices 170a and 170b to search for the backup service provider belonging to the same group.

In step S210, when receiving the querying service packet, the devices 170a and 170b determine whether the group identifier of the querying service packet matches its group identifier to decide whether to respond to the device 160. In the embodiment of FIG. 2B, the device 170a belongs to the first group, so the device 170a sends a response packet to the local device 160 to respond to the querying service packet. In the embodiment of FIG. 2B, the device 170b belongs to the second group which is different from the first group that the local device 160 belongs to, so the device 170b does not response any packet to the local device 160.

In step S220, the local device 160 receives the response packet from the device 170a, the response packet includes the group identifier and the device identifier of the device 170a.

In step S230, the device 160 creates the group device list according to the received response packet to make the backup plan. The group device list includes the device identifier of the device 170a that belongs to the same group as the local device 160.

In step S240, the local device 160 prepares the data block and sets the shared memory according to the backup plan to generate the data packet including the group identifier. In one embodiment, the local device 160 encrypts the data block to generate the data packet.

In step S250, the local device 160 sends the data packet including the group identifier to the target device (i.e., the device 170a) according to the backup plan.

In step S260, when receiving the data packet, the target device (i.e., the device 170a) backs up the data of the data packet to its shared memory. In one embodiment, the device 170a allocates the shared memory to store the backup data and the corresponding group identifier; therefore, the device 170a allows the data of other devices having the same group identifier to be stored in its shared memory. In one embodiment, the device 170a allocates the shared memory and configures the encryption process and an encryption key used for storing the backup data in advance; therefore, the device 170a is capable of decrypting the backup data to check out or use.

Reference is made to FIG. 3. FIG. 3 is a schematic diagram illustrating a packet format according to one embodiment of the present disclosure. As shown in FIG. 3, the format of each data packet 300 sent by the local device includes an operating segment 310 and a data segment 350. The operating segment 310 includes core information 320 and interface information 330. The core information 320 includes an operation 322, a group identifier 324, a my identifier 326 (i.e., the device identifier of the local device), and the like. The interface information 330 includes a checksum 332, a data size 334, and the like.

In one embodiment, the operation 322 carries information about the operation of controlling, such as the operation of searching for usable spaces, the operation of searching for devices, the operation of storing data, the operation of retrieving data, and so on. After reading the operation 322, the target device or the Workstation 150 executes the corresponding instruction. The contents of the checksum 332 and the data size 334 are the data used for the interface stacks, such as confirming whether the packet data contains error data due to the transmission factors. In one embodiment, because the interface information 330 is configured to confirm whether the packet data contains error data due to transmission variabilities, the interface information 330 may not be stored in the shared memory as the content of the backup data.

The data segment 350 includes a data attribute 360, an encrypted information 370, contents 380, and so on. The data attribute 360 includes an owner identifier 362, a data block identifier 364, and a protection indication 366. The owner identifier 362 is the original data owner of the device identifier; when the original data comes from the local device, the owner identifier 362 will be the same as the my identifier 326; on the contrary, when the local device is the intermediate device or the service provider, the owner identifier 362 will be different from the my identifier 326. Because the entire data may be divided into the multiple data blocks, the data block identifier 364 is used to identify the data blocks. The protection indication 366 is used to identify whether the data is encrypted, for example, the data is encrypted when the bit of the protection indication 366 is 1; the data is not encrypted when the bits of the protection indication 366 is 0.

The encrypted information 370 carries default data and group-shared data of the encryption data and indicates an encryption process. For example, when the devices belonging to the same group pre-agree an encryption-decryption algorithm for the encryption process being mutually applied, the group-shared data may be a public key. The encryption-decryption algorithm may be either symmetric or asymmetric encryption algorithms.

The contents 380 are used for storing the data block, such as configuration parameters, an event log, a firmware process, or the device data. In the closed or trusted local area network, the contents 380 are used for storing plaintext data, and the devices receiving the packet are capable of decrypting the contents 380 of the packet. In one embodiment, the contents 380 are used for storing the encrypted data block, and the devices having the access authority are capable of decrypting the original data of the contents 380 based on the encrypted information 370.

Figure 4A:
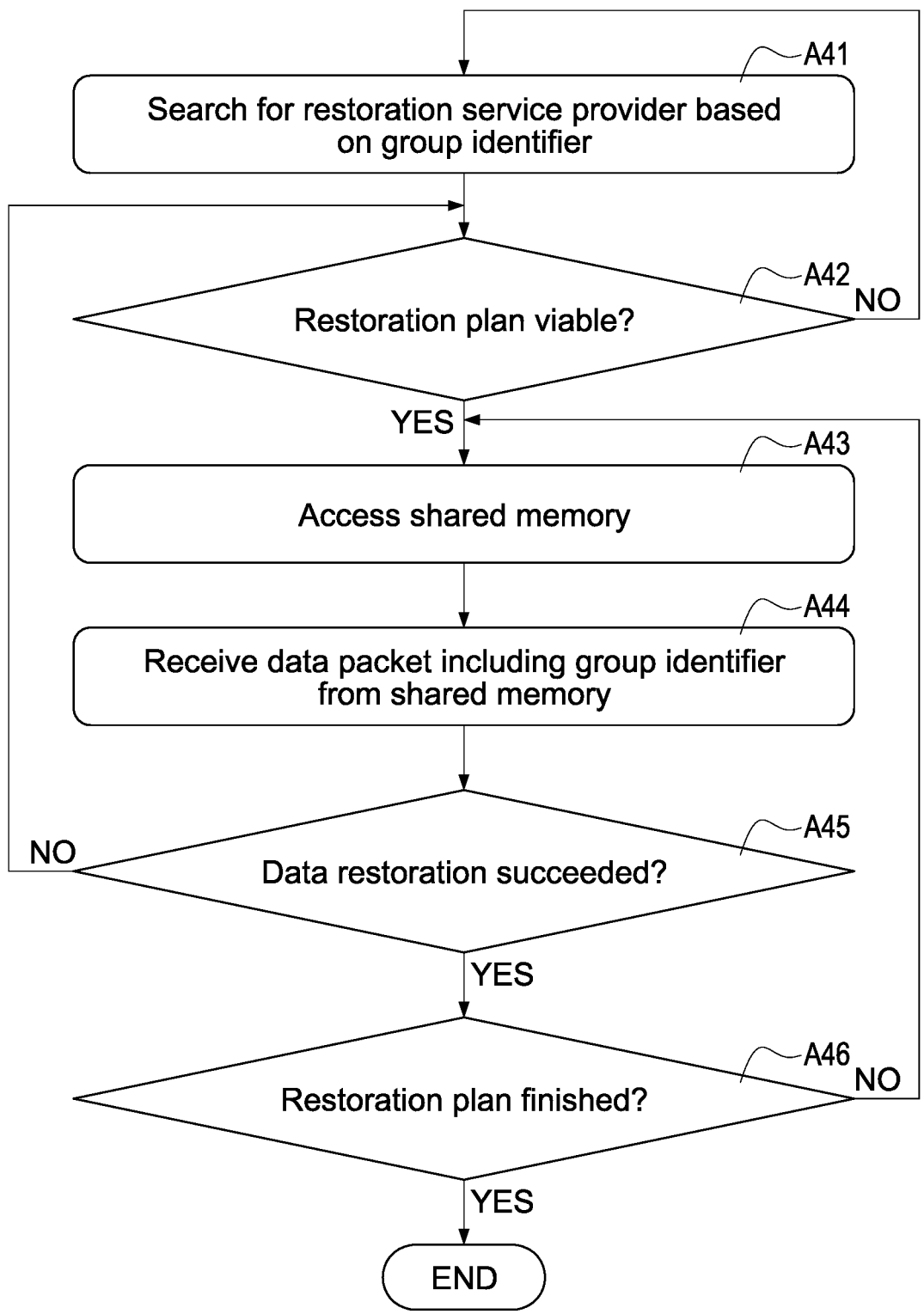
FIG. 4A is a flowchart illustrating data restoration performed by the devices according to one embodiment of the present disclosure.

To further illustrate the restoration process of the disclosure, reference is made to FIG. 4A. FIG. 4A is a flowchart illustrating data restoration performed by the devices according to one embodiment of the present disclosure. The data restoration process includes the following steps.

In step A41: Search for a restoration service provider based on the group identifier.
In step A42: Make a restoration plan and confirm whether the restoration plan is viable; go to step A43 if yea; go back to step A41 if no.
In step A43: Access the shared memory.
In step A44: Receive the data packet including the group identifier from the shared memory.
In step A45: Confirm whether the data restoration is succeeded; go to step A46 if yes; go back to step A42 if no.
In step A46: Confirm whether the restoration plan is finished; end the restoration process if yes; go back to step A43 if no.

In step A41, the local device searches for the restoration service provider based on the group identifier. Specifically, the local device sends the querying service packet including the group identifier to at least one device to search for the restoration service provider belonging to the same group. Further, the local device creates the group device list based on the searched restoration service provider.

In step A42, the local device makes the restoration plan and confirms whether the restoration plan is viable. When there is no restoration service provider or the network status is unavailable, such that the restoration plan is not viable or the packet transmitting fails, the local device updates the restoration plan to search for the backup service again (i.e., going back to step A41). In one embodiment, the restoration plan includes to-be-restored data and the corresponding shared memory (also called "data pool"). Specifically, the to-be-restored data is divided into multiple data blocks according to the data type, the data quantity, the time stamp, the serial number, and the like. Each data block is stored in at least one shared memory. Therefore, when the be-be-restored data block is selected, the local device selects the shared memory corresponding to the data block from the group device list according to the communication interface, the hop count, the device priority, and a data intactness, that is, selects the restoration service provider (i.e., the device which stores the backup data thereon) to receive the data packet to get recovering data. For example, the local device may select the shared memory based on the high data intactness and a similar communication interface, to receive the recovering data to minimize the risk of the restoration failure. For example, when the specified data block is available in the multiple shared memories, the local device sets the accessing priority for the multiple shared memories to retrieve the specified data block.

In step A43, when the restoration plan is viable, the local device retrieves the shared memory. For example, the local device sends the restoration request to the restoration service provider to retrieve the restoration data from the shared memory of the restoration service provider.

In step A44, the local device receives the data packet including the group identifier from the shared memory.

In step A45, the local device confirms whether the data restoration process is succeeded. For example, when the local device receives the data packet from the restoration service provider and is capable of decrypting and interpreting the data packet, the data restoration process is succeeded. On the contrary, when receiving the failure message from the restoration service provider or does not receive the data packet within the valid period, the local device renews the restoration plan and confirms whether the renewed restoration plan is viable (i.e., going back to step A42).

In step A46, when the restoration plan is not finished, the local device executes step A43 to step A45 again until the restoration plan is finished (such as the entire data that is divided into the multiple data blocks is recovered or the data block that is lost in part is retrieved and recovered). When the restoration plan is finished, the local device finishes the restoration process.

In one embodiment, in step A45 the data restoration process includes decrypting the data packet. The local device may decrypt the data packet under the premise of supporting the pre-agreed encryption process and having the encryption key; in other words, in the case that the data packet has to be sent through the intermediate device, the intermediate device is incapable of decrypting the data packet without the pre-agreed encryption process. If the hierarchical structure shown in FIG. 1 is an open network, to encrypt the data block protects information security.

In brief, through the data recovery process of the disclosure, the local device may search for the restoration service provider having the same group identifier in the hierarchical structure or the network topology of FIG. 1, and retrieves the data from the multiple shared memories to achieve the distributed data recovery. Further, through the flexible restoration plan and the encryption process, the disclosure provides the restoration data transmitted through effectively using the network nodes in the open network and protects information security.

Figure 4B:
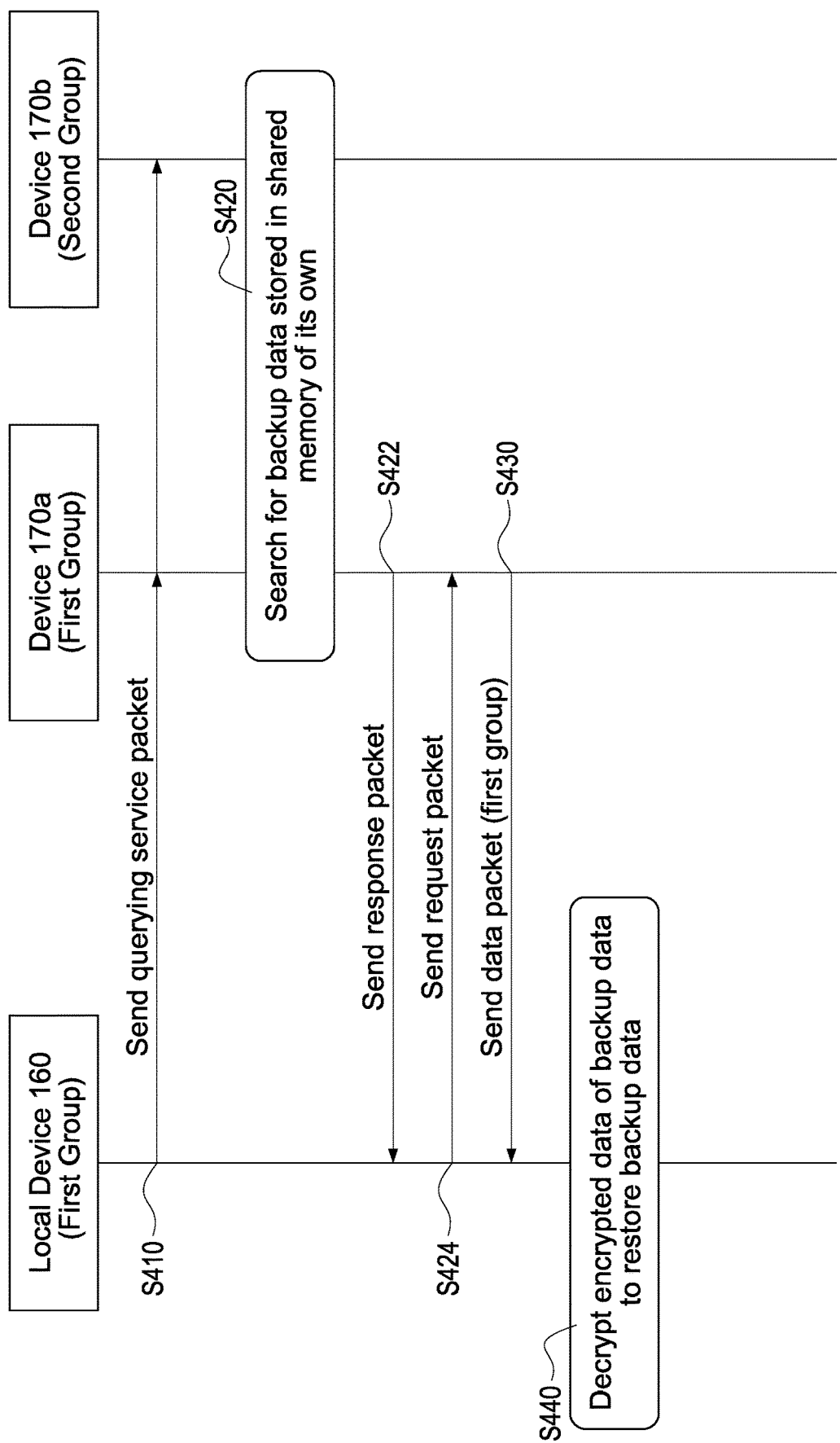
FIG. 4B is a packet sequence describing the data restoration according to one embodiment of the present disclosure.

FIG. 4B is a packet sequence describing the data restoration according to one embodiment of the present disclosure. In step S410, the local device 160 sends the querying service packet including the group identifier to at least one of the devices 170a and 170b to search for the service provider belonging to the same group. In one embodiment, the querying service packet includes an owner identifier and a data block identifier. Therefore, the service provider belonging to the same group may search for the specified data block in its shared memory.

For example, in the data backup process, the data packet sent by the local device 160 includes the owner identifier 362 and the data block identifier 364. Therefore, the backup service provider (i.e., the device 170a) stores the backup data, the owner identifier 362, and the data block identifier 364 (or the data segment 350 of the data packet) in the shared memory. In the following data recovery process, the restoration service provider (i.e., the device 170a) of the local device 160 may take the owner identifier 362 and the data block identifier 364 as an index of searching for the backup data.

In step S420, after receiving the querying service packet, the device 170a and the device 170b respectively search for the backup data stored in their shared memory according to the owner identifier 362 and the data block identifier 364.

In step S422, when determining that the data block stored in the shared memory matches the owner identifier 362 and the data block identifier 364, the device 170a returns a response packet to the local device 160. In one embodiment, when the backup data is stored at the encrypted status in the shared memory, the device 170a retrieves the encrypted information 370 of the encrypted backup data, such as the hash value, to determine whether to send the response packet to the local device 160. On the other hand, since the shared memory of the device 170b of FIG. 4B does not store any backup data satisfying the condition mentioned above, the device 170b does not perform any action.

In step S424, when deciding to retrieve the backup data from the device 170a, the local device 160 sends a request packet to the device 170a.

In step S430, in response to the request packet, the device 170a sends the data packet to the local device 160 to return the backup data stored in the shared memory. In one embodiment, the device 170a performs the encryption process to the backup data to generate the data packet. In one embodiment, the backup data is stored at the encrypted status in the shared memory, so the device 170a packs the encrypted backup data into the data packet.

In step S440, the local device 160 uses the encryption-decryption algorithm to decrypt the encrypted data of the data packet, to recover the backup data. In one embodiment, the local device 160 uses the configuration parameters of the backup data, the firmware process, or the device data to reset the machine, so the reset device may be recovered to the former status.

Figure 5:
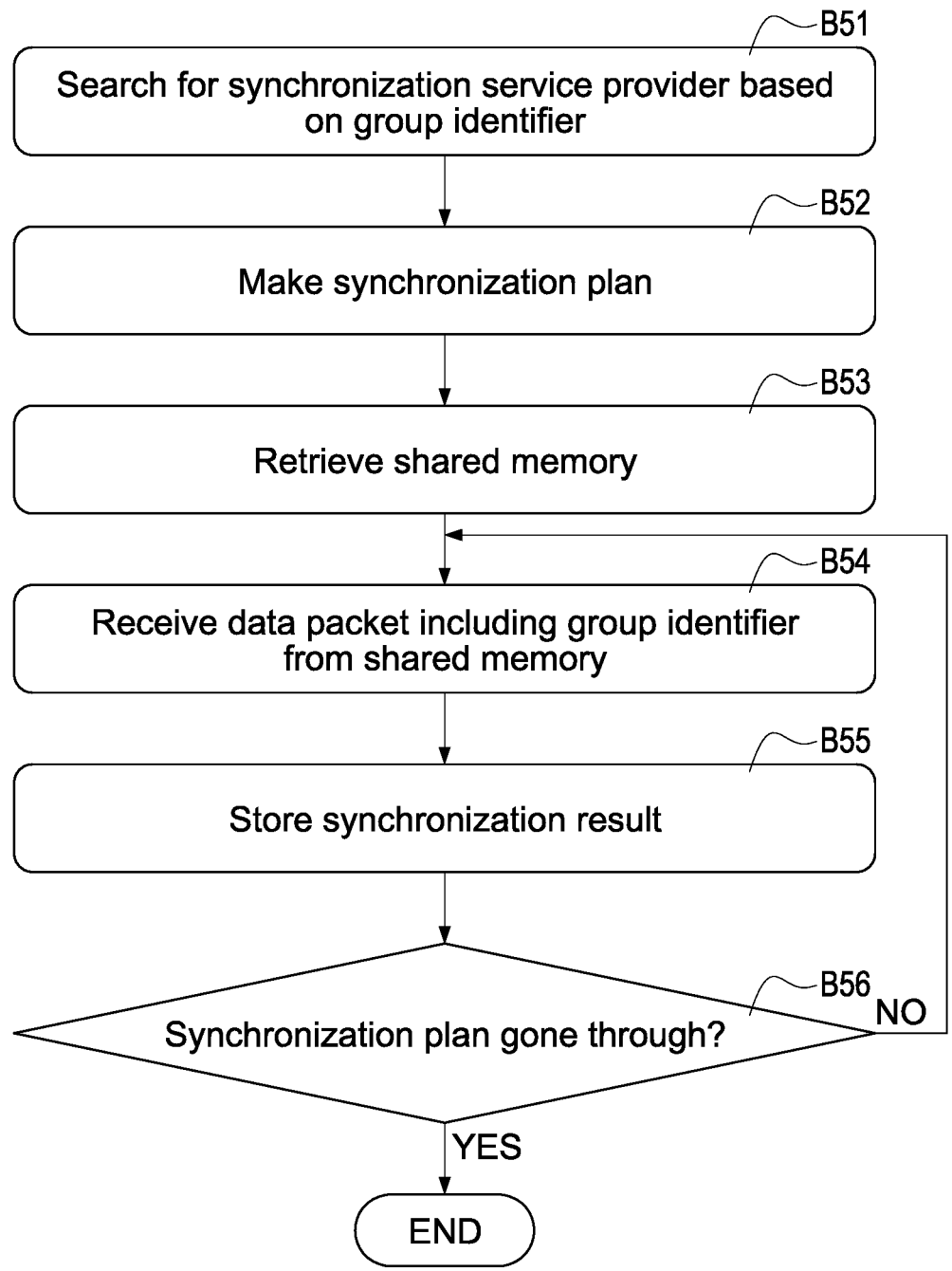
FIG. 5 is a flowchart illustrating data synchronization performed by the devices according to one embodiment of the present disclosure.

FIG. 5 is a flowchart illustrating a data synchronization performed by the devices according to one embodiment of the present disclosure. The data synchronization includes the following steps.

In step B51: Search for the synchronization service provider based on the group identifier.
In step B52: Make the synchronization plan.
In step B53: Retrieve the shared memory.
In step B54: Receive the data packet including the group identifier from the shared memory.
In step B55: Store the synchronization result.
In step B56: Confirm whether the synchronization plan is gone through; end the data synchronization process if yes; go back to step B53 if no.

In step B51, the local device (such as one of the upstream devices including the Workstation 150, the HMIs 130a to 130b, and the PLCs 120a to 120c) searches for the synchronization service provider based on the group identifier. Specifically, the local device sends the querying service packet including the group identifier to at least one device to search for the synchronization service provider belonging to the same group. In response to the querying service packet, the synchronization service provider sends the response packet including the group identifier 324, the owner identifier 362, and the data block identifier 364 as the feedback.

In step B52, the local device makes the synchronization plan based on the response packet sent by the synchronization service provider. In one embodiment, the synchronization plan includes to-be-synchronized data and the corresponding shared memory (also called "data pool").

In step B53, the local device accesses the shared memory. For example, the local device sends the synchronization request to the synchronization service provider to request the synchronization backup data from the shared memory of the synchronization service provider (such as newly backed-up data blocks).

In step B54, the local device receives the data packet including the group identifier from the shared memory.

In step B55, the local device records the synchronization result. When the local device receives the data packet from the synchronization service provider and the data packet is correctly decrypted and interpreted, it is recorded as a successful data synchronization. On the other hand, when the local device receives the failure message from the synchronization service provider or does not receive any data packet within a valid period, it is recorded as a failed data synchronization. In one embodiment, when the data synchronization still fails after the local device performs the synchronization for several times (such as 3 times), the local device performs synchronization plan for synchronizing next data.

In step B56, when the synchronization plan has not gone through, the local device performs step B53 to step B55 again until the synchronization plan is gone through (e.g., the recently backed-up data found is attempted for synchronization). When the synchronization plan has gone through, the local device finishes the data synchronization process.

In brief, by performing the data synchronization process of the present disclosure, the upstream devices proactively synchronize the backup data to serve as the data source when the downstream devices need to perform the data restoration. In one embodiment, the Workstation 150 and the multiple devices shown in FIG. 1 may form a data management system. Each device and the Workstation 150 of the data management system performs the processes of FIG. 2A, FIG. 4A, and FIG. 5 by the user instructions, the system schedules, and the access authority to achieve the data backup, the data restoration, and the data synchronization.

Figure 6:
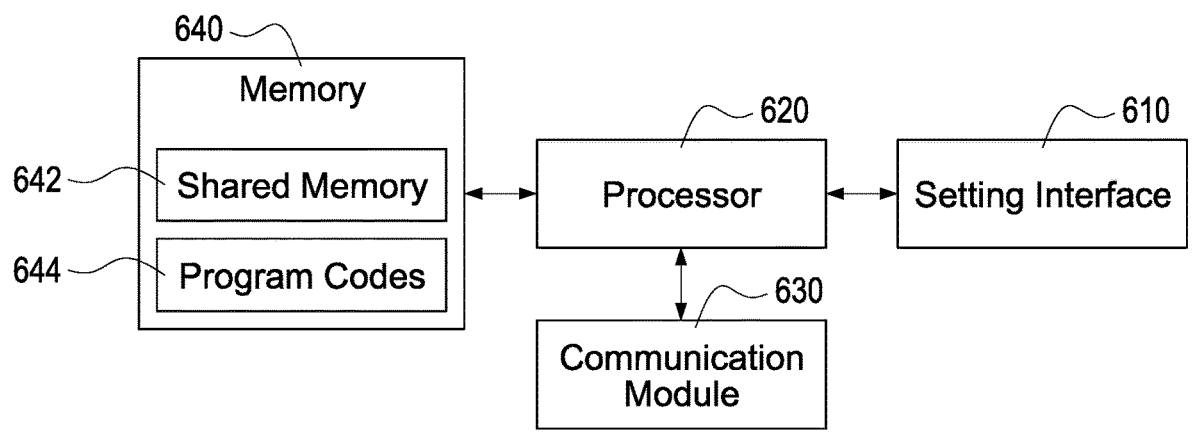
FIG. 6 is a circuit block diagram illustrating an electronic device according to one embodiment of the present disclosure.

Reference is made to FIG. 6. FIG. 6 is a circuit block diagram illustrating an electronic device according to one embodiment of the present disclosure. An electronic control device is shown in FIG. 6, which may be any device of FIG. 1. The electronic control device includes a setting interface 610, a processor 620, a communication module 630, and a memory 640. In the structural aspect, the processor 620 is connected with the setting interface 610, the communication module 630, and the memory 640.

The processes shown in FIG. 2A, FIG. 4A, and FIG. 5 may be programmed as program codes 644 and the program codes 644 may be stored in the memory 640 for the processor 620 to execute to perform the data backup, restoration, and synchronization. The processor 620 may be but is not limited to a Central Processing Unit (CPU), a System on Chip (SoC), an Application Specific Integrated Circuit (ASIC), an audio processor, a Digital Signal Processor (DSP), or other processing chips or controller for specific functions.

The setting interface 610 may be a control panel disposed on the device or an interface implemented by the software providing the user to input data or instructions.

Part of the memory 640 is configured to be the shared memory 642. The shared memory 642 is configured to store the shared backup data of the local device and other devices. The memory 640 may be but is not limited to a Random Access Memory (RAM), a nonvolatile memory (such as flash memory), a Read-Only Memory (ROM), a Hard Disk Drive (HDD), a Solid-State Drive (SSD), or an Optical Storage.

The communication module 630 is configured to communicate with other devices to send or receive the packets. The communication module 630 supports at least one of the RS-485 communication interface and the Ethernet communication interface (including the IEEE 802.3 communication protocol).

As mentioned above, through the data backup, the data restoration, and the data synchronization process, the local device may search for the service providers with the same group identifier in the hierarchical structure or the network topology as shown in FIG. 1, and use multiple shared memories to perform the data backup, the data restoration, and the data synchronization process, thereby achieving distributed the data backup, the data restoration, the data synchronization, and deployments. Furthermore, due to the flexible data backup, restoration, and synchronization plans, and the encryption process, the present disclosure fully utilizes the network nodes to transmit the backup data and protect information security in the trusted local area networks or open networks.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computer implemented data backup method for multiple devices applied for a local device of the multiple devices in a hierarchical structure for industrial control systems, comprising:
   1) sending a querying service packet including a group identifier of the local device to search in one of multiple heterogeneous device groups for at least one backup service provider, wherein each of the multiple heterogeneous device groups comprises the multiple devices of at least one device type, wherein each of the multiple devices respectively comprises the group identifier indicating one of the multiple heterogeneous device groups that the device belongs to;
   2) receiving at least one response packet including the group identifier to make a backup plan by searching for the at least one backup service provider from one of the multiple heterogeneous device groups that the local device belongs to, wherein the backup plan comprises to-be-backed-up data and a shared memory of the backup service provider that sends the response packet, wherein every device comprises a memory with a part of the memory being configured as the shared memory, every device has an authority to access the shared memory of all devices in same heterogeneous device group, and only one or more of the multiple devices having same group identifier with the local device response the response packet to the local device after receiving the querying service packet;
   3) preparing a data block and setting the shared memory of the at least one backup service provider based on the backup plan to generate a data packet comprising the group identifier and the data block to be backed up; and
   4) sending the data packet to the at least one backup service provider to back up the data block to the shared memory.

2. The computer implemented data backup method of claim 1, wherein each of the at least one response packet comprises a device identifier, and the step 2) comprises:
   21) creating a group device list based on the device identifier;
   22) dividing the to-be-backed-up data into multiple data blocks based on at least one of a data type, a data quantity, a time stamp, and a serial number; and
   23) selecting from the group device list the shared memory corresponding to each of the multiple data blocks based on at least one of a communication interface, a hop count, a device priority, and a memory capacity, wherein the hop count refers to transition of data from the local device to the backup service provider.

3. The computer implemented data backup method of claim 2, wherein when multiple of the at least one backup service provider in the group device list is capable of multicasting, the method further comprises following steps after the step 2):
   selecting multiple shared memories to the multiple data blocks to make a multicast backup plan;
   preparing the multiple data blocks and setting the multiple shared memories for the multiple backup service providers based on the multicast backup plan to generate the data packet comprising the group identifier and the data block; and
   sending the data packet to the multiple backup service providers to back up the data block to the multiple shared memories.

4. The computer implemented data backup method of claim 2, wherein the step 3) comprises packaging the data block as the data packet based on a packet format, and the packet format comprises:
an operating segment comprising:
core information comprising an operation, the group identifier, and my identifier, wherein the my identifier is a device identifier of the local device; and
interface information comprising a checksum and a data size; and
a data segment comprising:
a data attribute comprising an owner identifier, a data block identifier, and a protection indication, wherein the data block identifier is applied for identifying the data block, wherein the owner identifier is the device identifier of an owner of the data block;
an encrypted information; and
a content.

5. The computer implemented data backup method of claim 4, wherein the step 3) further comprises:
performing an encryption process to the data block to generate the data packet, wherein the encrypted information indicates the encryption process and the content is the data block being encrypted.

6. The computer implemented data backup method of claim 1, further comprising:
5) Confirming whether the data backup is succeeded, comprising:
confirming that the data backup is succeeded when receiving a backup acknowledgment from the at least one backup service provider; and
going back to the step 2) when receiving a failure message from the at least one backup service provider or not receiving the backup acknowledgment within a valid period; and
6) Confirming whether the backup plan is finished when the data backup is succeeded, comprising:
when the backup plan is not finished, performing the step 3) to the step 5) until the backup plan is finished; and
when the backup plan is finished, the data backup method is completed.

7. The computer implemented data backup method of claim 1, wherein the step 4) further comprises sending data packet to the at least one backup service provider by at least one intermediate device of the multiple devices to back up the data block to the shared memory.

8. A computer implemented data restore method for multiple devices applied for a local device of the multiple devices in a hierarchical structure for industrial control system, comprising:
A1) sending a querying service packet comprising a group identifier of the local device to search in one of multiple heterogeneous device groups for at least one restoration service provider, wherein each of the multiple heterogeneous device groups comprises the multiple devices of at least one device type, wherein each of the multiple devices respectively comprises the group identifier indicating one of the multiple heterogeneous device groups that the device belongs to;
A2) receiving at least one response packet comprising the group identifier from the at least one restoration service provider to make a restoration plan by searching for the at least one restoration service provider from one of the multiple heterogeneous device groups that the local device belongs to, wherein the restoration plan comprises to-be-restored data and a shared memory of the restoration service provider that sends the response packet, wherein every device comprises a memory with a part of the memory being configured as the shared memory, every device has an authority to access the shared memory of all devices in same heterogeneous device group, and only one or more of the multiple devices having same group identifier with the local device response the response packet to the local device after receiving the querying service packet;
A3) sending a restoration request to the at least one restoration service provider based on the restoration plan to request the shared memory from the at least one restoration service provider for retrieving a data block; and
A4) receiving a data packet comprising the group identifier and the data block from the at least one restoration service provider.

9. The computer implemented data restore method of claim 8, wherein each of the at least one response packet further comprises a device identifier, and the step A2) comprises:
A21) creating a group device list based on the device identifier;
A22) selecting the data block from the to-be-restored data comprising multiple data blocks based on at least one of a data type, a data quantity, a time stamp, and a serial number; and
A23) selecting the shared memory corresponding to the data block from the group device list based on at least one of a communication interface, a hop count, a device priority, and a memory capacity, wherein the hop count refers to transition of data from the local device to the restoration service provider.

10. The computer implemented data restore method of claim 9, wherein when multiple of the at least one restoration service provider in the group device list is capable for multicasting, the method further comprises following steps after the step A2):
selecting multiple shared memories to the multiple data blocks to make a multicast restoration plan;
sending multiple restoration requests to the multiple restoration service providers based on the multicast restoration plan to request multiple shared memories from the multiple restoration service providers for retrieving the multiple data blocks; and
receiving multiple data packets comprising the group identifier and the multiple data blocks from the multiple restoration service providers.

11. The computer implemented data restore method of claim 8, wherein the step A23) comprises:
respectively setting an accessing priority of the multiple shared memories when multiple of the shared memory exist in the group device list to be selected for the data block.

12. The computer implemented data restore method of claim 8, further comprising following steps between the step A3) and the step A4):
when the restoration service provider confirms that both the group identifier and an encrypted information of the data block are correct, the restoration service provider transmits the data packet to the local device; and
when the restoration service provider confirms that one of the group identifiers and an encrypted information of the data block is incorrect, the restoration service provider transmits a failure message to the local device or acts without response.

13. The computer implemented data restore method of claim 12, further comprising:

A5) confirming whether a data restoration is succeeded, comprising:
A51) confirming that the data restoration is succeeded when receiving the data packet from the restoration service provider and correctly decrypting and interpreting the data packet; and
A52) going back to the step A2) when receiving the failure message from the restoration service provider or not receiving the data packet within the valid period; and
A6) confirming whether the restoration plan is finished when the data restoration is succeeded, comprising:
when the restoration plan is not finished, performing the step A3) to the step A5) until the restoration plan is finished; and
when the restoration plan is finished, the data restore method is completed.

14. The computer implemented data restore method of claim 8, wherein the step A4) further comprises:
receiving the data packet comprising the group identifier and the data block from the at least one of restoration service provider by at least one intermediate device of the multiple devices.

15. A computer implemented data synchronization method for multiple devices applied for a local device of the multiple devices in a hierarchical structure for industrial control systems, comprising:
B1) sending a querying service packet comprising a group identifier of the local device to search in one of multiple heterogeneous device groups for at least one synchronization service provider, wherein each of the multiple heterogeneous device groups comprises the multiple devices of at least one device type, wherein each of the multiple devices respectively comprises the group identifier indicating one of the multiple heterogeneous device groups that the device belongs to;
B2) receiving at least one response packet comprising the group identifier from the at least one synchronization service provider to make a synchronization plan by searching for the at least one synchronization service provider from one of the multiple heterogeneous device groups that the local device belongs to, wherein the synchronization plan comprises to-be-synchronized data and a shared memory of the synchronization service provider that sends the response packet, wherein every device comprises a memory with a part of the memory being configured as the shared memory, every device has an authority to access the shared memory of all devices in same heterogeneous devices group, and only one or more of the multiple devices having same group identifier with the local device response the response packet to the local device after receiving the querying service packet;
B3) sending a synchronization request to the at least one synchronization service provider to request for synchronizing a data block from the shared memory of the at least one synchronization service provider; and
B4) receiving a data packet comprising the group identifier and the data block from the at least one synchronization service provider.

16. The computer implemented data synchronization method of claim 15, further comprising:
B5) recording a synchronization result, comprising:
B51) recording that data synchronization is succeeded when receiving the data packet from the synchronization service provider and correctly decrypting and interpreting the data packet; and
B52) recording that the data synchronization fails when receiving a failure message from the synchronization service provider or not receiving the data packet within a valid period; and
B6) confirming whether the synchronization plan is finished, comprising:
when the synchronization plan is not finished, performing the step B3) to the step B5) until the synchronization plan is finished; and
when the synchronization plan is finished, the data synchronization method is completed.

17. The computer implemented data synchronization method of claim 15, further comprising following steps between the step B3) and the step B4):
when the synchronization service provider confirms that both the group identifier and encrypted information of the data block are correct, the synchronization service provider transmits the data packet to the local device; and
when the synchronization service provider confirms that one of the group identifiers and the encrypted information of the data block is incorrect, the synchronization service provider transmits the failure message to the local device or acts without response.

18. The computer implemented data synchronization method of claim 17, wherein the step B5) further comprises:
B53) when receiving the failure message from the synchronization service provider or not receiving the data packet within a valid period, performing the step B3) to the step B5) to resynchronize the data block; and
B54) after failing to resynchronize for several times, performing the data synchronization of next data block of the synchronization plan.

19. The computer implemented data synchronization method of claim 15, wherein the step B4) further comprises:
receiving the data packet comprising the group identifier and the data block from the at least one synchronization service provider by an intermediate device of the multiple devices.

* * * * *